Dec. 15, 1970  F. W. HORNER ET AL  3,546,787
FLUIDIZED BED COOLER
Filed Aug. 30, 1968  3 Sheets-Sheet 2
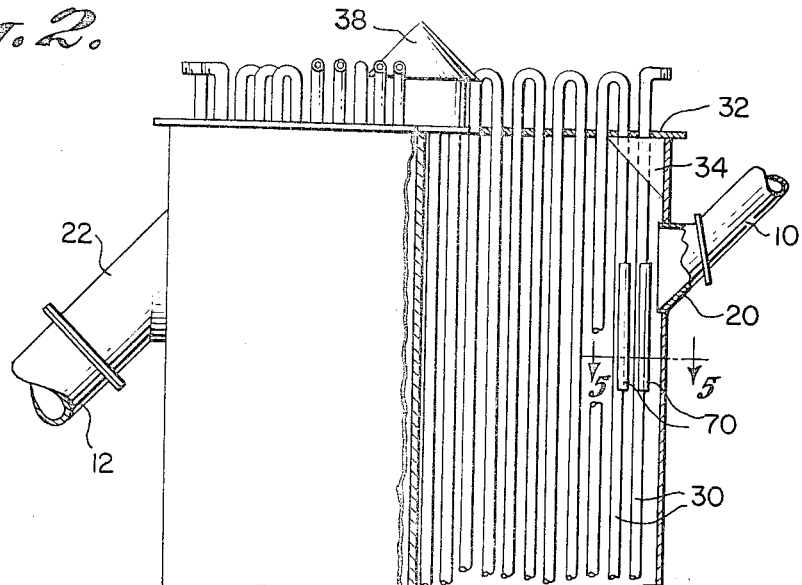
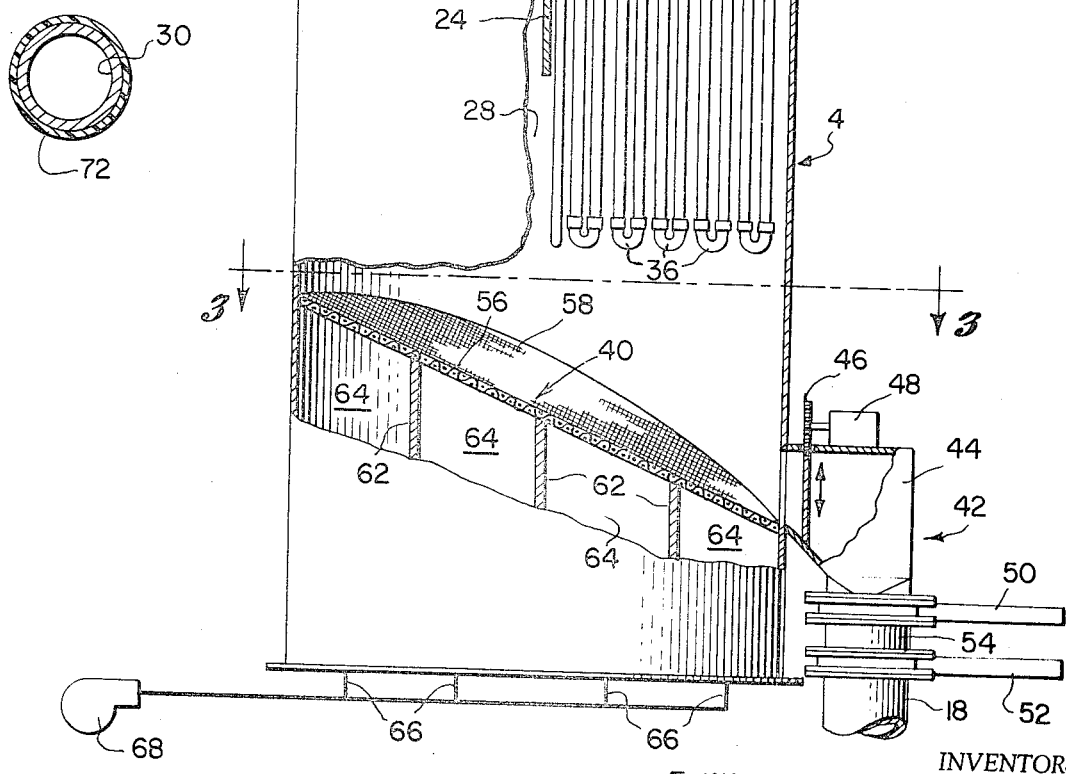
INVENTORS
F. WALTER HORNER,
ERWIN L. DECKER &
LAWRENCE E. VEO
BY Jack L. Prather
ATTORNEY

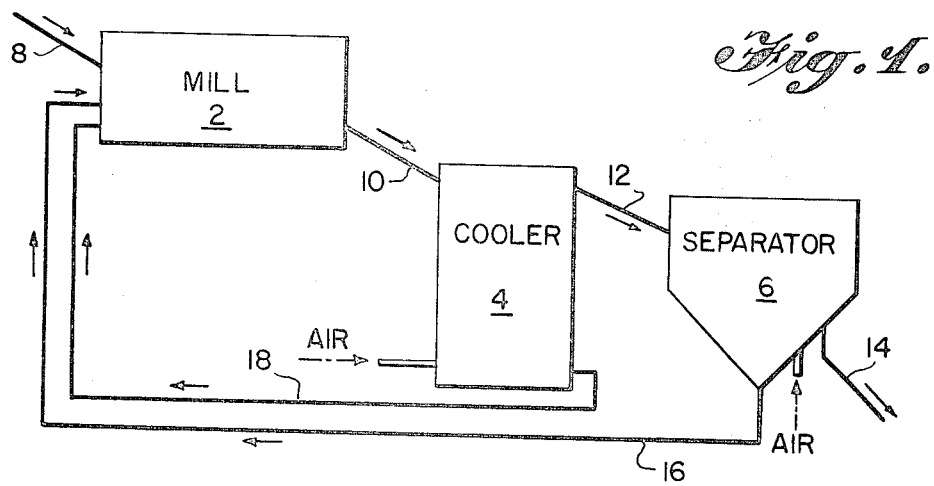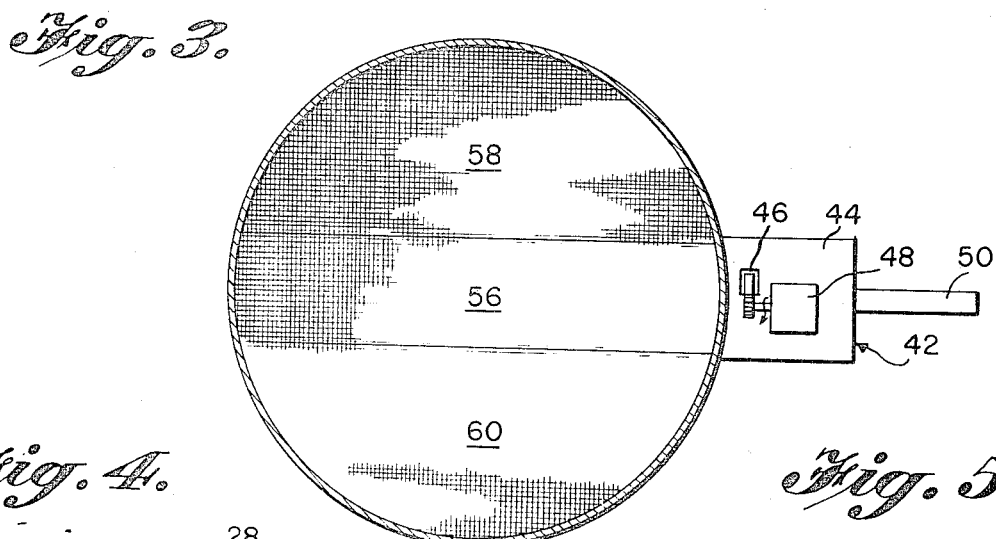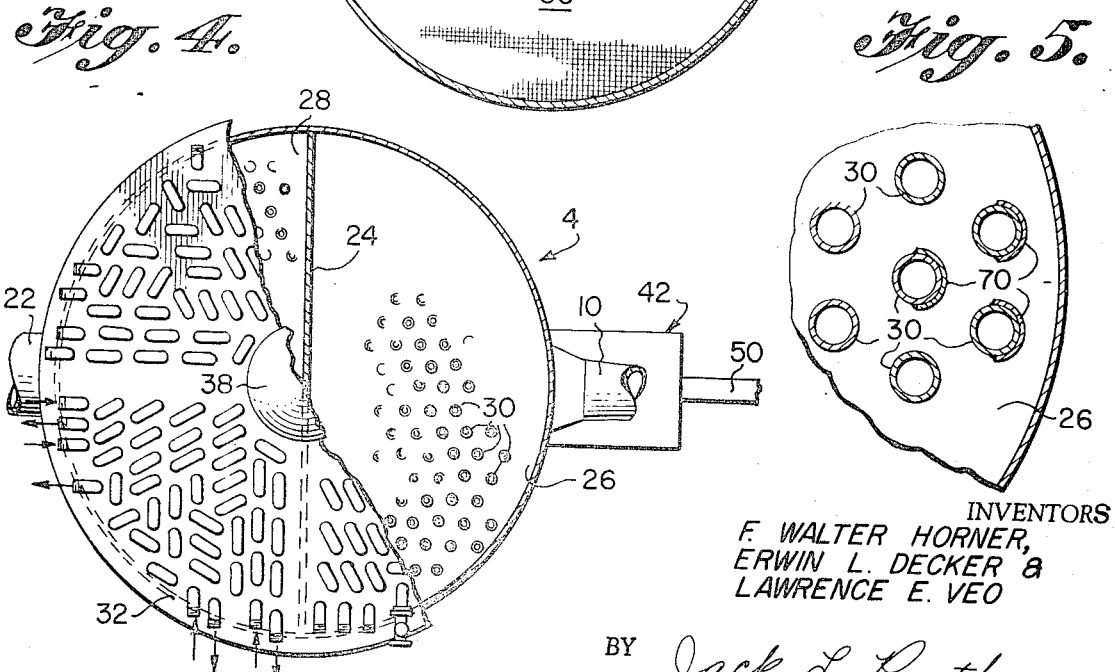

INVENTORS
F. WALTER HORNER,
ERWIN L. DECKER &
LAWRENCE E. VEO

BY Jack L. Prather
ATTORNEY

United States Patent Office 3,546,787
Patented Dec. 15, 1970

3,546,787
FLUIDIZED BED COOLER
Frank Walter Horner, Bethlehem, Erwin Louis Decker, Catasauqua, and Lawrence E. Veo, Allentown, Pa., assignors to Fuller Company
Filed Aug. 30, 1968, Ser. No. 756,510
Int. Cl. F26b 17/10, 25/00
U.S. Cl. 34—57                                             8 Claims

ABSTRACT OF THE DISCLOSURE

The present invention relates to a fluidized material cooler for in-circuit cooling of Portland cement, and other particulate materials capable of being fluidized, which comprises a vertically arranged vessel divided into two compartments of substantially equal cross-sectional area by a singular baffle member and having a plurality of and substantially equal number of vertically arranged heat-exchange tubes in each compartment, and a gas permeable deck adjacent the bottom of vessel and spaced from the terminating end of the baffle member in such a manner that material entering at the top of one compartment will flow downwardly along the surfaces of the heat-exchange elements then around the baffle horizontally across the heat-exchange tubes and upwardly through the second compartment along the surfaces of the heat-exchange tubes therein to the output where the cooled material is discharged.

---

The present invention relates to an apparatus for the cooling of particulate solid materials and in particular in-circuit cooling of finish mill ground Portland cement.

More specifically, the present invention relates to a cooling vessel having a gas permeable floor or deck and heat-exchange elements throughout a portion of the vessel and spaced from the bottom wherein the material, upon entering the vessel, will be fluidized and flow past the heat-exchange elements as would water or any other fluid.

In the past, there have been many attempts to provide a satisfactory cooler of this type; for example, in the patent to McEntee, Jr., 3,253,650, there is shown a cylindrical vessel having a gas permeable bottom and a series of vertically extending heat-exchange tubes, the ends of which terminate short of the gas permeable bottom deck. Each tube has a plurality of radially extending fins, which extend the full length thereof. Upon entering the cooler from the top, the hot material flows downwardly to a material outlet located adjacent the permeable deck, which is slanted downwardly toward the outlet.

The present invention is considered an improvement over that of the type shown in McEntee and eliminates certain problems known to be encountered in this prior type material cooler as well as other types of coolers, especially when used in combination with other standard components of a closed grinding mill circuit, all of which is described in more detail below.

A better understanding of the invention may be derived from the accompanying drawings and descriptions in which:

FIG. 1 is a schematic view of the present invention as used in a closed-circuit finish mill system;

FIG. 2 is a vertical sectional view of a fluidized cooler embodying the preferred form of the present invention;

FIG. 3 is a horizontal sectional view of the present invention taken along lines 3—3 of FIG. 2;

FIG. 4 is a partially sectional plan view of the preferred form of the present invention;

FIG. 5 is an enlarged horizontal cross-sectional view of a portion of certain heat-exchange members taken along lines 5—5 of FIG. 1;

FIG. 6 is an enlarged cross-sectional view of a modified form of a heat-exchange member according to the present invention;

Figure 7:
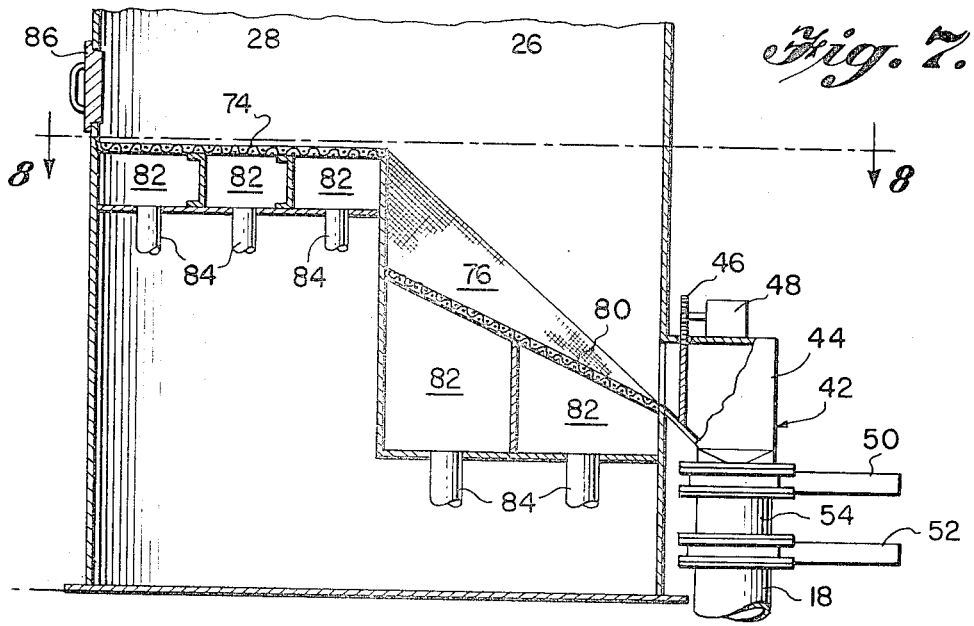
FIG. 7 is a vertical cross-sectional view of a modified form of the gas-permeable deck of the present invention.

In the manufacture of finish cement, cement clinker is produced from various raw material in a rotary kiln or the like and discharged therefrom at a temperature of approximately 2,000–2,500° F. The clinker is then rapidly cooled to approximately 150° F. in a clinker cooler such as the reciprocating grate-type cooler shown in the patent to Douglass, 2,137,158. The next step requires reducing the size of the clinker to a finely ground state which is generally done in a ball mill. During this grinding operation, heat is added to the cement material due primarily to friction between the material itself and that between the steel grinding balls and the mill shell. Without adequate cooling, the cement would reach temperatures in excess of 240–250° F., which would cause dehydration and false-setting resulting in an inferior and unacceptable product. Various means have been tried to lower the temperature of the material within the mill, such as water sprays and the like, however, the most successful means of doing so has been found to be in-circuit cooling. The theory behind in-circuit cooling as represented in FIG. 1 is to cool the total mill discharge and recirculate approximately two-thirds of the mill discharge from the separator back into the mill which will thus lower or maintain the total in-mill material temperature to an acceptable level.

In FIG. 1, there is shown closed grinding mill circuit provided with in-circuit cooling and comprising a cement mill 2, material cooler 4 according to my present invention, and a separator 6.

Clinker mixed with gypsum is fed into the mill via line 8. From the mill the ground material is then passed to a material cooler via line 10 wherein the material is reduced in temperature to approximately 150° F., which is the maximum temperature preferred for finish cement. The cooler output passes via line 12 to separator 4, which may be of the general air-separator type as shown in U.S. patent to Jäger, 2,973,861. This type of separator operates on the principle that the force of a gas, usually air, flowing upwardly through the vessel, will separate finish size particles causing them to flow upward over a baffle means and out through line 14, while the heavier particles will not be overcome by the force of the air and fall by gravity to the discharge line 16. Conventional means, such as a blower (not shown) are used to convey these oversize tailings from the separator through line 16 back for re-entry through the mill. Spitzers and other oversized material of greater size or density than that passed to the separator is also collected at the cooler deck by a material trap means, described more fully below for continuous removal back to mill 2 via line 18.

In FIG. 2, the preferred embodiment of the cooler 4 comprises an inlet 20, which receives hot material from mill discharge line 10 and an outlet 22 from which is discharged cooled material to line 12. A baffle 24, preferably of steel plate construction, extends transversely the full width of vessel 4, and downwardly for a major portion of the vertical length of the vessel to divide the vessel into two compartments, 26 and 28. As shown, the baffle plate terminates short of the terminal ends of heat-exchanger tubes 30, described below so as to effect a certain degree of cross flow of material across the end portions of the tubes 30 in both compartments.

Within each compartment, 26 and 28, there is located a series of heat-exchange tubes 30. These tubes may be standard steel pipe. However, they may also be constructed of different materials depending on ease of fabrication, heat transfer coefficient desired and other considerations. As shown in FIGS. 2 and 4, the tubes are supported and welded to support plate 32, which in turn is supported by at least two knee braces 34 diametrically opposite one another and each spaced 90° from transversely extending baffle member 24 and by the baffle member 24 itself.

Each of the tubes are arranged generally parallel to one another. The ends of adjacent tubes are interconnected to one another by means of elbow members 36 to provide a singular coolant flow path through any desired number of tubes. In the example shown in FIG. 4, there are eight separate coolant flow paths per compartment. The number of flow paths may be varied at will, depending on the coolant flow pressure drop which can be tolerated per any one system. At the top of vessel 4, there is provided a vent 38.

The lower portion of cooler 4 comprises a gas permeable deck, generally designated as 40, which is disposed on an incline downwardly in the direction of inlet 20. Inclination of the deck downwardly is preferred, as opposed to the deck being inclined downwardly in the direction of the outlet, since the spitzers will have a tendency to fall out directly on that portion of the deck which is nearest the material trap described below. This direct fall out is caused primarily by the directional characteristics of the tubes 30 in compartment 26 on the material flow and the inertia of the oversize and dense spitzers. If the deck were inclined in the opposite direction, these spitzers would in some circumstances have a tendency to collect on the deck thus interfering with control of the pressure drop across the deck. They would also, in some circumstances, tend to score the gas-permeable fabric of the deck as they flow to the material trap. The material trap 42, referred to above, comprises a discharge conduit 44 having an adjustable flow gate 46 of standard construction. For purposes of illustration, the flow gate 46 is shown as being vertically adjustable by means of rock and pinion type drive from reversible motor 48. The flow gate controls the spitzer outflow in accordance with the amount of trap material collecting at the exit and the capacity of the material trap itself. The material trap further includes a discharge control valve mechanism consisting of two reciprocable slide gates 50 and 52 having a collection cylinder 54 therebetween. The discharge control valve mechanism is a commercially available unit sold under the trade name De Zurik. The slide gates reciprocate from open to closed position alternately, so as to provide continuous seal and at the same time continuous conveying of trap material back through line 18 to mill 2. As an alternative, a rotary gate valve or feeder, such as shown in U.S. patent to Weller, 2,681,748, for the flow gate and discharge control valve mechanism. However, in such case, modification would be necessary in order to prevent or relieve binding of the trap material between the rotary blades and the adjacent cylinder walls.

The deck 40 itself, shown in FIGS. 2 and 3, is substantially V-shaped and comprises three separate sections 56, 58, and 60 of gas-permeable fabric. Porous stone and other equivalents are also acceptable as the gas-permeable media as is well known in the art. Each section is adequately supported by members 62, which also may enclose and define separate plenum chambers 64 as shown. Air or other fluidizing gas is supplied to each plenum chamber from respective individually controlled gas supply lines 66, all of which have a common source 68. By such means, the rate of gas supplied to each plenum chamber develops a predetermined pressure drop across the respective sections so that the rate of flow of material through the cooler may be controlled. In practice, it is desirable to maintain the material in compartment 28 at a lesser fluidized density than that in compartment 26 to induce flow. A slight difference in head between inlet 20 and outlet 22 also aids in inducing flow.

As shown in FIGS. 2 and 5, it has been found advantageous to provide certain of heat-exchange tubes 30 with individual wear plates 70. This is done to those tubes adjacent inlet 20, which are subjected to the full abrasive effect of the incoming material before it has become fluidized. The length of the wear plate need only extend a short distance below the lowermost portion of inlet 20. The wear plates can be readily replaced when worn, which avoids the necessity of replacing the entire tube as was prior practice.

In FIG. 6, there is shown a modified version of the heat-exchanger tubes to be used in the present invention. One of the most common problems in the tube-type fluidized material cooler is adherence of the material to the exterior surface of the pipes causing an excessive build-up, which decreases the temperature gradient and thus lowers the efficiency of the cooler. The fin-type cooler tubes of McEntee, Jr., 3,253,650, were one means of solving this problem in that although the temperature differential between the cooling medium and material was decreased, the surface area was greatly increased to a point where adequate cooling was allegedly obtained, but adherence of the material, due to the hot material hitting the cold surface of the cooling tubes, which is commonly referred to as "shock effect," was avoided. However, the applicant has found other means of avoiding this same problem. For reasons not altogether known, the particular construction of the present invention, even with standard 2″ steel pipe used as heat-exchanger tubes, results in no serious adherence of material on the surface of the pipes.

The answer may lie in the fact that the flow path has been, by means of baffle plate 24, effectively doubled so that for the same output requirements from the cooler, the material must pass through the same number of tubes and same surface area but at twice the flow rate. Be that as it may, the applicant has also found it advantageous in certain instances to coat the material's exposed side of the pipes with a surface material 70, such as Teflon and the like, having properties which greatly reduce the degree of adherence of the material to the pipes. For example, tests have indicated a definite relation between the degree of material adherence and material flow rate, smoothness of heat-exchange element surfaces and direction of material flow across the heat-exchange elements. In the present invention, it may be preferable to coat the tube surfaces with Teflon or the like in only that area around the terminating end of baffle 24, where there is crossflow of material across the tubes in compartments 26 and 28.

Figure 8:
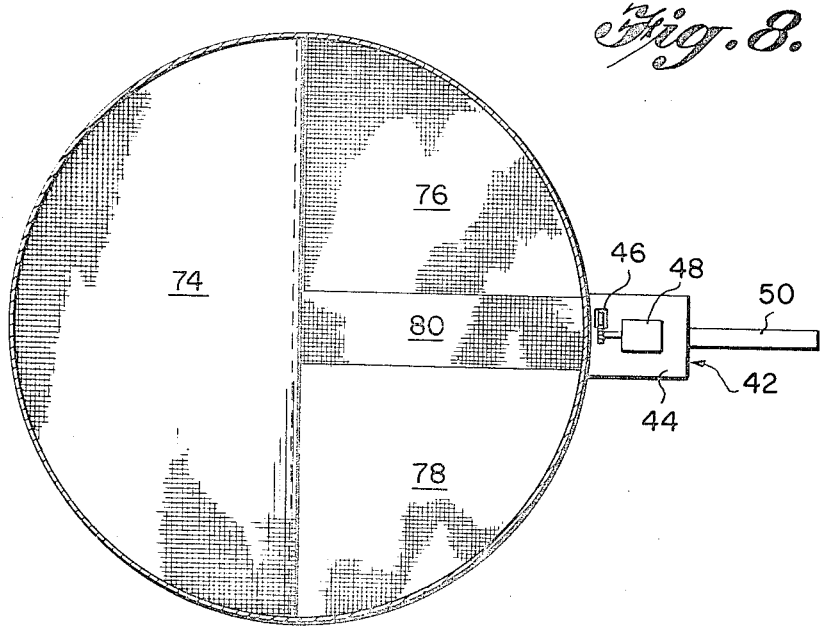
FIG. 8 is a partial cross-sectional plan view taken along lines 8—8 of FIG. 6.

In FIGS. 7 and 8, there is shown a modified version of the plenum chamber and deck assembly wherein the deck is divided into a horizontally disposed portion 74, covering the cross-sectional half of the cooling vessel represented by compartment 28 and a substantially V-shaped deck portion covering the other half of the cooling vessel. The latter half of the deck comprises two radially inwardly and downwardly sloping surfaces 76 and 78, which converge at an inwardly disposed plane deck portion 80 inclined in the direction of inlet 20 in the same manner as the deck shown in FIGS. 2 and 3.

Each of the deck portions 74, 76, 78, and 80 may be comprised of a plurality of individual plenum chambers 82. Each of these plenum chambers may be supplied with air or other fluidizing gas from individually controlled supply lines 84 substantially as shown, all of which may be connected to a common source of supply (not shown). Such a construction of the deck assembly is advantageous in certain situations where head room for the cooler must be kept at a strict minimum. Any oversize material or tramp material, commonly referred to cumulatively in the trade as "spitzers," will drop out on to the slanted deck surfaces and to the material trap, as the flow of material is reversed from its substantially gravity descent in compartment 26 of the cooling vessel. The material trap is the same as in FIG. 2; therefore, only discharge conduit 44 is shown. If any spitzers should collect on portion 74 of the deck and interfere with the rate of fluidization, they may be removed by opening access door 86 and scraping them off.

While we have shown several types of decks which may be used, the important consideration is that of having an inclined deck, preferably inclined downwardly in the direction of the inlet site of the cooler, leading to a material trap for continuous removal of spitzers for screening and/or reconveyance back to the mill at a point in the material flow circuit which will not interfere with the constant rate discharge of cooled material from the cooler. A plane surfaced deck is also considered satisfactory provided the material trap entrance is widened sufficiently to provide for removal of spitzers without accumulation thereof along the sides of the cooler.

In operation, mill discharge material enters the inlet 20 through line 10 and descends by gravity through compartment 26 of the cooling vessel. A fluidizing gas is supplied by means of individually controlled supply pipes into the respective plenum chambers and out through the deck 40, which preferably has a substantially uniform permeability rate throughout each individual section of the deck. The action of the fluidizing gas causes the incoming material in compartment 26 to be subjected to a fluidizing action wherein the material flows as would be a liquid past the heat-exchange elements 30 giving up its heat. The material will flow past the terminal end of the baffle plate 24 and upwardly through compartment 28 of the vessel to outlet 22.

There is substantially the same number of heat-exchange elements within both compartments 26 and 28 of the vessel. Each compartment 26 and 28 is of preferably substantially the same cross-sectional area. The distance between baffle 24 and the deck is great enough to prevent constriction of flow and preferably defines a cross-sectional area equal to that of the vessel compartments 26 and 28. Due to this fact, the resistance to flow of the material is substantially the same to prevent surging of the material. This lack of surging is one important advantage of the present invention over the prior art and lends itself to more efficient operation of the total mill circuit in that the separator efficiency is dependent upon, to a great extent, uniform flow conditions from the cooler. Without this, the separator would either be uselessly passing an excessive number of finish-size material back to the grinding mill, or would be passing over-size material to separator 14.

While I have shown my preferred embodiment with several modifications, I do not wish to limit myself to the precise instructions disclosed, but reserve the right to resort to various modifications and changes in shape, size and arrangement of parts, and the like without departing from the spirit of my invention or the scope of the appendant claims.

We claim:

1. A closed circuit system comprising a mill, an apparatus for cooling and separating particulate solid materials capable of being maintained as a fluidized bed of materials, means for passing the particulate solid materials from said mill to said cooling and separating apparatus, and means for substantially continuously recycling a major portion of the particulate solid material from said cooling and separating apparatus to said mill, said cooling and separating apparatus comprising:
   vessel means defining a cooling chamber having a material inlet means and a material outlet means,
   a gas-permeable deck means at the end of said vessel means opposite said inlet means,
   said deck means including an upper deck and a plenum chamber means located therebelow,
   means for supplying gas to said plenum chamber means to fluidize the solid materials to be cooled within said vessel means,
   flow directing means within said vessel for directing the flow of the material from said inlet means to said outlet means, and
   heat-exchanger means within said vessel means, and said recycling means comprising material trap means adjacent said deck means of said cooling and separating apparatus for substantially continuous withdrawal of the particulate solid material from said vessel means and means for passing said material from said trap means to said mill.

2. The apparatus defined in claim 1 wherein:
   said flow directing means includes a substantially vertically disposed baffle means extending traversely across substantially the full width of said vessel means and terminating in spaced relation from said deck means, and
   said heat-exchange means includes a plurality of substantially vertically disposed tubes, each interconnected one to another in a plurality of groups to define separate systems and adapted to receive therein a recirculating coolant fluid.

3. The apparatus as defined in claim 2 wherein:
   said baffle means consists of a baffle plate dividing said vessel means into two compartments of substantially equal cross-sectional area.

4. The apparatus as defined in claim 2 wherein:
   at least a portion of at least one of said tubes is exteriorly coated with a plastic material.

5. The apparatus as defined in claim 1 wherein:
   said plenum chamber means comprises a plurality of separate plenum chambers, and
   said means for supplying gas to said plenum chamber means including means for controlling the rate of gas supply to each respective plenum chamber.

6. The apparatus as defined in claim 1 wherein:
   said deck means is substantially V-shaped throughout at least a portion thereof and inclined downwardly in the direction of said inlet means.

7. A closed circuit system comprising a mill and an apparatus for cooling and separating particulate solid materials capable of being maintained as a fluidized bed of materials, means for passing the particulate solid materials from said mill to said cooling and separating apparatus, and means for substantially continuously recycling a major portion of the particulate solid material from said cooling and separating apparatus to said mill, said cooling and separating apparatus comprising:
   vertically disposed cylindrical vessel means defining a cooling chamber having a material inlet means and a material outlet means, both at one end of said vessel,
   a gas-permeable deck means at the end of said vessel means opposite said inlet means,
   said deck means including an upper deck and a plenum chamber means located therebelow,
   said deck means being substantially V-shaped throughout at least a portion thereof and inclined downwardly in the direction of said inlet means,
   means for supplying gas to said plenum chamber means to fluidize the solid materials to be cooled within said vessel means,
   flow directing means within said vessel for directing the flow of the material from said inlet means to said outlet means,
   said flow directing means including a substantially vertically disposed baffle means extending transversely across substantially the full width of said vessel means and terminating in spaced relation from said deck means,
   said baffle means consisting of a baffle plate dividing said vessel means into two compartments of substantially equal cross-sectional area, heat-exchange means within said vessel means, and said heat-exchange means including a plurality of substantially vertically disposed tubes, each interconnected one to another in a plurality of groups to define separate systems and adapted to receive therein a recirculating coolant fluid, and said recycling means comprising material trap means adjacent said deck means for substantially continuous withdrawal of the particulate solid material from said vessel means and means for passing said material from said trap means to said mill.

8. A closed grinding mill system comprising a mill, cooler and separator and means interconnecting same; wherein the cooler comprises a vessel having an inlet means and an outlet means, fluidized bed chamber means for receiving the solid materials to be cooled, heat-exchanger means within the chamber having coolant means circulated therethrough, gas-permeable deck means located at the other end of the vessel from said inlet means and defining a floor on said vessel having a gas supply plenum chamber means and located therebelow including means for supplying gas thereto, baffle means within said vessel for directing the flow of the material past said heat-exchanger means in at least two different directions of flow;

said baffle means comprising at least one baffle plate extending from substantially the top of said vessel downwardly a distance spaced from said floor;

said heat-exchanger means including a plurality of substantially vertically disposed tubes;

said tubes being interconnected at the ends thereof to provide at least one continuous coolant flow path;

a substantially equal number of said tubes being disposed on each side of said baffle plate; and said outlet means located adjacent the end of said vessel opposite said gas-permeable deck means, and said means interconnecting same includes a recycling means comprising material trap means adjacent said deck means of said cooler for substantially continuous withdrawal of a major portion of the particulate solid material from said vessel and means for passing said material from said trap means to said mill.

References Cited

UNITED STATES PATENTS

| 1,801,195 | 4/1931 | Fraser | 209—474 |
|---|---|---|---|
| 2,500,519 | 3/1950 | Clark | 34—57X |
| 2,629,938 | 3/1953 | Montgomery | 165—104X |
| 2,759,710 | 8/1956 | Paille | 165—104X |
| 2,761,668 | 9/1956 | Sylvest | 34—57X |
| 2,865,504 | 12/1958 | Zubrzycki et al. | 209—138 |
| 2,940,735 | 6/1960 | Marsh | 165—104X |
| 3,050,786 | 8/1962 | St. John et al. | 18—59 |
| 3,136,531 | 6/1964 | Wesselingh | 34—57X |
| 3,264,751 | 8/1966 | McEntee | 165—104X |
| 3,265,124 | 8/1966 | Reys | 165—133 |

ALBERT W. DAVIS, Jr., Primary Examiner

U.S. Cl. X.R.

34—102; 165—65, 104, 133; 209—138, 474; 263—32